(12) United States Patent
Amano (10) Patent No.: US 11,416,734 B2
(45) Date of Patent: Aug. 16, 2022

(54) INTEGRATED SENSING SYSTEM

(71) Applicant: Konica Minolta Business Solutions U.S.A., Inc., San Mateo, CA (US)

(72) Inventor: Jun Amano, Hillsborough, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 430 days.

(21) Appl. No.: 16/729,817

(22) Filed: Dec. 30, 2019

(65) Prior Publication Data

US 2021/0201114 A1    Jul. 1, 2021

(51) Int. Cl.
*H04L 67/12* (2022.01)
*G06N 3/04* (2006.01)
*G06F 16/27* (2019.01)
*G06N 3/08* (2006.01)

(52) U.S. Cl.
CPC .......... *G06N 3/0454* (2013.01); *G06F 16/27* (2019.01); *G06N 3/08* (2013.01); *H04L 67/12* (2013.01)

(58) Field of Classification Search
CPC ................... H04L 63/1416; G06N 3/0454
See application file for complete search history.

(56) References Cited

U.S. PATENT DOCUMENTS 6,839,636 B1    1/2005    Sunshine et al.
2019/0104138 A1*    4/2019    Storms ............... H04L 63/1416

OTHER PUBLICATIONS

Extended European Search Report issued in the counterpart European Patent Application No. 20217797.8, dated May 20, 2021 (11 pages).
Ricardo Omar Chavez-Garcia et al; "Multiple Sensor Fusion and Classification for Moving Object Detection and Tracking," Jan. 2014, pp. 1-11 (11 pages).
Scott Stillman et al; "Towards Reliable Multimodal Sensing in Aware Environments," Georgia Institute of Technology; pp. 1-6 (6 pages).
ProVision No. 83 The Future Pioneered by Cognitive Computing P12-15 Reprinted from Customer Interview "SoftBank Group" Published Oct. 31, 2014 (14 Pages).

* cited by examiner

*Primary Examiner* — Sulaiman Nooristany (57) ABSTRACT

An integrated sensing system to perform multi-modality sensing of an environment. The integrated sensing system includes a first sensing element that generates a first modality sensing output of the environment, a first edge artificial intelligence (AI) engine that controls the first sensing element and generates a first data analysis result based on the first modality sensing output, a second sensing element that generates a second modality sensing output of the environment, a second edge AI engine that controls the second sensing element and generates a second data analysis result based on the second modality sensing output, and a computer processor that generates, using a central AI algorithm, a classification result of the environment based on the first data analysis result and the second data analysis result, where the computer processor is directly coupled to the first edge AI engine and the second edge AI engine.

20 Claims, 6 Drawing Sheets

INTEGRATED SENSING SYSTEM

BACKGROUND

The term "modality" refers to a form of sensation. Example modalities include vision, audition, tactition, gustation, olfaction, and thermoception, equilibrioception, which correspond to the sensation of visible signal, audible signal, vibration or movement, taste, smell, heat, and balance.

Cloud computing is the use of computer system resources, such as data storage and computing power, available to many users over the Internet. The computer system resources available over the Internet for cloud computing is referred to as the Cloud.

Currently, most sensing systems have only one modality in detection of a certain stimulus with limited ranges. As a result, applications of the sensing system are highly specialized and segmented without generalized platform. For very limited multiple sensing modality systems, a central computing system in the Cloud with network connection is required to control sensing modalities resulting in a large cost and time delay.

SUMMARY

In general, in one aspect, the invention relates to an integrated sensing system to perform multi-modality sensing of an environment. The integrated sensing system includes a first sensing element that generates a first modality sensing output of the environment, a first edge artificial intelligence (AI) engine that controls the first sensing element and generates a first data analysis result based on the first modality sensing output, a second sensing element that generates a second modality sensing output of the environment, a second edge AI engine that controls the second sensing element and generates a second data analysis result based on the second modality sensing output, and a computer processor that generates, using a central AI algorithm, a classification result of the environment based on the first data analysis result and the second data analysis result, where the computer processor is directly coupled to the first edge AI engine and the second edge AI engine.

In general, in one aspect, the invention relates to a method to perform multi-modality sensing of an environment. The method includes generating, by a first sensing element, a first modality sensing output of the environment, generating, by a first edge artificial intelligence (AI) engine for controlling the first sensing element, a first data analysis result based on the first modality sensing output, generating, by a second sensing element, a second modality sensing output of the environment, generating, by a second edge AI engine for controlling the second sensing element, a second data analysis result based on the second modality sensing output, and generating, by a computer processor using a central AI algorithm, a classification result of the environment based on the first data analysis result and the second data analysis result, where the computer processor is directly coupled to the first edge AI engine and the second edge AI engine.

In general, in one aspect, the invention relates to a non-transitory computer readable medium (CRM) storing computer readable program code to perform multi-modality sensing of an environment. The computer readable program code, when executed by a computer processor, includes functionality for generating, by a first sensing element, a first modality sensing output of the environment, generating, by a first edge artificial intelligence (AI) engine for controlling the first sensing element, a first data analysis result based on the first modality sensing output, generating, by a second sensing element, a second modality sensing output of the environment, generating, by a second edge AI engine for controlling the second sensing element, a second data analysis result based on the second modality sensing output, and generating, by a central AI engine using a central AI algorithm, a classification result of the environment based on the first data analysis result and the second data analysis result, where the computer processor is directly coupled to the first edge AI engine and the second edge AI engine.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide an integrated sensing system that combines a comprehensive collection of sensing modalities for multiple different stimuli. The integrated sensing system includes sensing elements with high sensing ranges to function as a universal sensing platform for many applications. All sensing, controlling, and decision-making artificial intelligence (AI) processes are completed by the integrated sensing system independently without accessing a networked control computing system through the Cloud. Accordingly, a secure sensing method is achieved with low cost and rapid response time. While sensing for a certain stimulus is determined by the decision-making AI within the integrated sensing system, collaborative intelligence using multiple integrated sensing systems may be utilized to assist each other using a blockchain with heightened security.

Figure 1:
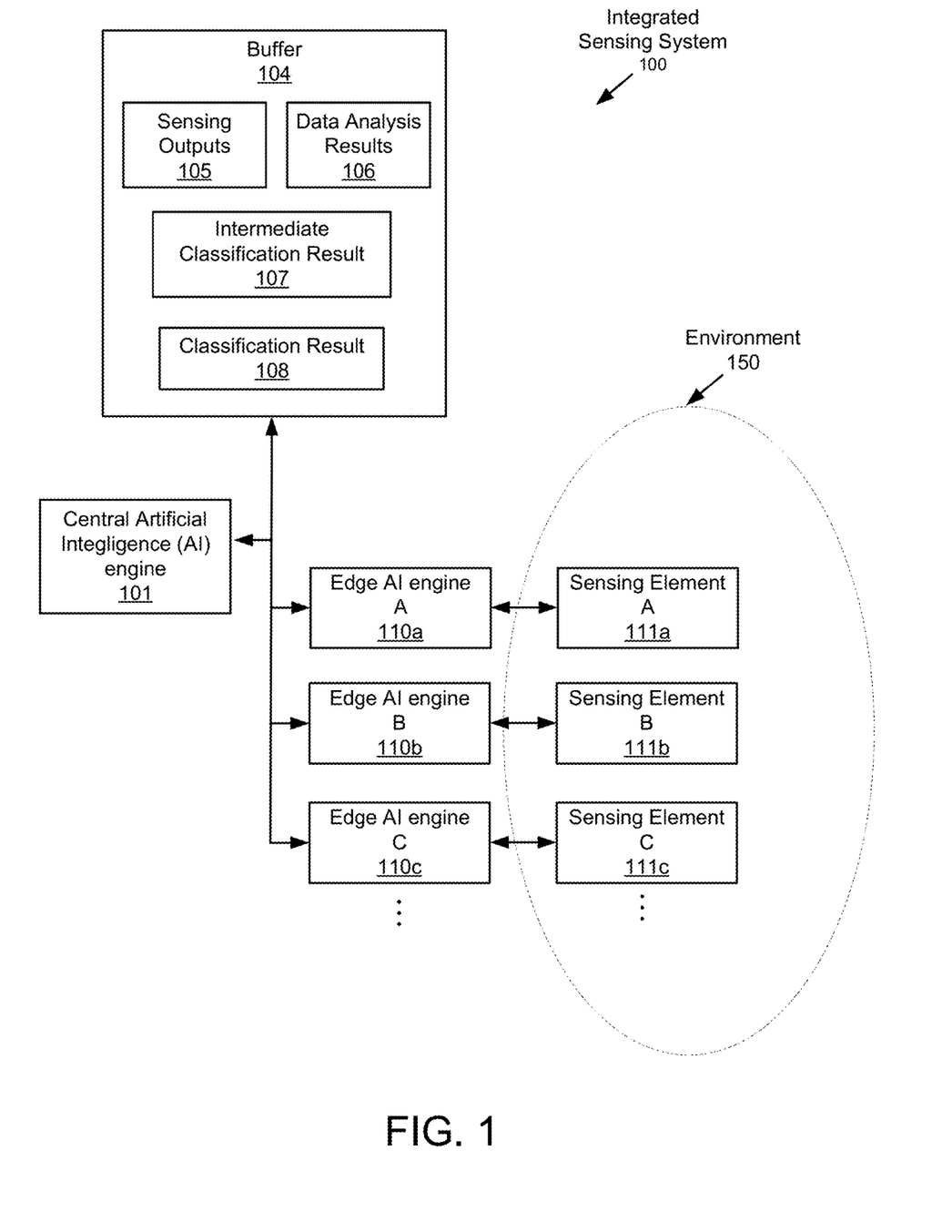
FIG. 1 shows a system in accordance with one or more embodiments of the invention.

FIG. 1 shows an integrated sensing system (100) in accordance with one or more embodiments of the invention. As shown in FIG. 1, the integrated sensing system (100) has multiple components, including, for example, a buffer (104), a central artificial intelligence (AI) engine (101), and multiple edge AI engines coupled with corresponding sensing elements. For example, an edge AI engine A (110*a*) is coupled with a sensing element A (111*a*), an edge AI engine B (110*b*) is coupled with a sensing element B (111*b*), and an edge AI engine C (110*c*) is coupled with a sensing element C (111*c*). The sensing elements have multiple modalities and are disposed throughout an environment (150), which is a physical area within ranges of the sensing elements of integrated sensing system (100). The environment (150) may include naturally occurring objects (e.g., living and non-living things) and/or artificial objects (e.g., buildings, machines, etc.).

Each of these components (101, 104, 110a, 110b, 110c) may be located on the same computing device (e.g., personal computer (PC), laptop, tablet PC, smart phone, multifunction printer, kiosk, server, etc.) or on different computing devices that are connected directly without any intervening network, such as a wide area network or a portion of Internet of any size having wired and/or wireless segments. Each of these components is discussed below.

In one or more embodiments of the invention, the buffer (104) may be implemented in hardware (i.e., circuitry), software, or any combination thereof. The buffer (104) is configured to store data generated by and/or used by the integrated sensing system (100). As shown in FIG. 1, sensing outputs (105) are generated by the sensing elements for use by the edge AI engines, data analysis results (106) are generated by the edge AI engines for use by the central AI engine (101), and an intermediate classification result (107) and an classification result (108) are generated by the central AI engine (101). In particular, the sensing outputs (105) correspond to measurements of detected changes or events of various modalities and at various time points in the environment (150). The data analysis results (106) represent initial assessment of ongoing activities in the environment (150) by individual edge AI engines based on individual sensing outputs. Specifically, each of the individual sensing outputs is of a single modality. The intermediate classification result (107) and classification result (108) are intermediate and final assessment of ongoing activities in the environment (150) by the central AI engine (101) based on aggregate data analysis results of multiple modalities.

The sensing outputs (105), data analysis results (106), intermediate classification result (107), and classification result (108) may be a part of a collection of intermediate and final data of the integrated sensing system (100). Further, the sensing outputs (105), data analysis results (106), intermediate classification result (107), and classification result (108) may be of any size and in any suitable format. Although the buffer (104) is shown as a single component, in other embodiments of the invention, the buffer (104) may be divided into separate components. For example, each of the sensing outputs (105) and each of the data analysis results (106) may be stored locally with the corresponding edge AI engine, while the intermediate classification result (107) and classification result (108) may be stored locally with the central AI engine (101).

In one or more embodiments of the invention, each of the sensing element A (111a), sensing element B (111b), and sensing element C (111c) is a physical device configured to detect events or changes in the environment (150). Accordingly, each sensing element generates a sensing output that represents a detected event or change. Generally, the sensing elements are configured to detect different types of events or changes in the environment (150) where each type of event or change corresponds to a particular modality. For example, the sensing output generated by the sensing element A (111a) may be referred to as a first modality sensing output, the sensing output generated by the sensing element B (111b) may be referred to as a second modality sensing output, and the sensing output generated by the sensing element C (111c) may be referred to as a third modality sensing output. The first modality sensing output, second modality sensing output, and third modality sensing output are a part of the sensing outputs (105).

In one or more embodiments of the invention, each of the edge AI engine A (110a), edge AI engine B (110b), edge AI engine C (110c) may be implemented in hardware (i.e., circuitry), software, or any combination thereof. Generally, the edge AI engines are configured to control corresponding sensing elements and analyze corresponding sensing outputs to generate data analysis results. In particular, the edge AI engine A (110a) is configured to control the sensing element A (111a) and analyze the sensing output of the sensing element A (111a) to generate a corresponding data analysis result, referred to as a first data analysis result. Specifically, the edge AI engine A (110a) generates the first data analysis result based on the sensing output of the sensing element A (111a). Similarly, the edge AI engine B (110b) is configured to control the sensing element B (111b) and analyze the sensing output of the sensing element B (111b) to generate a corresponding data analysis result, referred to as a second data analysis result. Specifically, the edge AI engine B (110b) generates the second data analysis result based on the sensing output of the sensing element B (111b). Further, the edge AI engine C (110c) is configured to control the sensing element C (111c) and analyze the sensing output of the sensing element C (111c) to generate a corresponding data analysis result, referred to as a third data analysis result. Specifically, the edge AI engine C (110c) generates the third data analysis result based on the sensing output of the sensing element C (111c). The first data analysis result, second data analysis result, and third data analysis result are a part of the data analysis results (106).

In one or more embodiments of the invention, the central AI engine (101) may be implemented in hardware (i.e., circuitry), software, or any combination thereof. The central AI engine (101) is configured to generate, using a central AI algorithm, the classification result (108) of the environment (150) based on the data analysis results (106). The central AI engine (101) is further configured to provide the classification result (108) to a notification unit (not shown) of the environment (150) that is configured to perform a notification task (e.g., generating an audible and/or visible alarm) of the environment (150) based on the classification result (108). An application example of the central AI engine (101) and the notification unit of the environment (150) is described in reference to FIGS. 3A-3C below.

Although not explicitly shown, the central AI engine (101) may include a communication interface configured to communicate with one or more additional integrated sensing systems through a connection network (e.g., a point-to-point connection network or a private block chain network). Accordingly, multiple integrated sensing systems, including the integrated sensing system (100), may exchange intermediate classification results via the communication interface and the connection network. Accordingly, the classification result (108) may be cooperatively generated by the interconnected integrated sensing systems based on the intermediate classification results.

In one or more embodiments of the invention, the central AI engine (101), edge AI engine A (110a), edge AI engine B (110b), and edge AI engine C (110c) perform the functionalities described above using the method described in reference to FIG. 2 below.

Although the integrated sensing system (100) is shown as having three edge AI engines (110a, 110b, 110c) with corresponding sensing elements, as well as two other components (101, 104), in other embodiments of the invention, the integrated sensing system (100) may have more or fewer edge AI engines and/or more or fewer other components. Further, the functionality of each component described above may be split across components. Further still, each component (101, 104, 110*a*, 110*b*, 110*c*) may be utilized multiple times to carry out an iterative operation.

Figure 2:
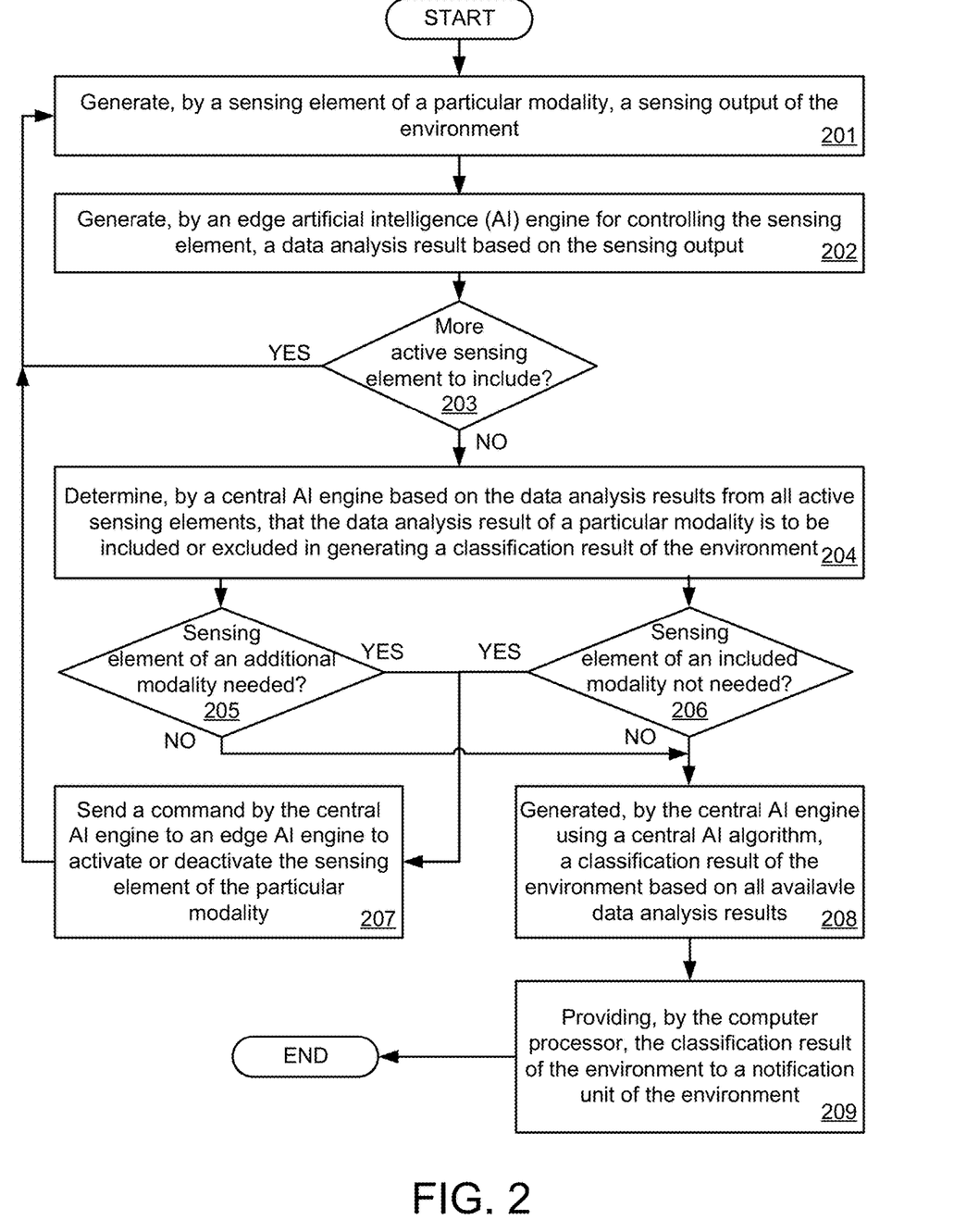
FIG. 2 shows a flowchart in accordance with one or more embodiments of the invention.

FIG. 2 shows a flowchart in accordance with one or more embodiments of the invention. One or more of the steps in FIG. 2 may be performed by the components of the integrated sensing system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially in Step 201, a sensing output is generated by a sensing element of a particular modality. The sensing output may be generated continuously or in response to a command from an edge AI engine controlling the sensing element. The command may be sent to the sensing element by the edge AI engine periodically, intermittently, as triggered by a predetermined condition in the environment, or based on other predetermined criteria. Further, the sensing element may be activated or deactivated by the edge AI engine that controls the sensing element. Specifically, a sensing element does not generate sensing output while in the deactivated state.

In Step 202, the sensing output is sent to and analyzed by the edge AI engine to generate a data analysis result. Specifically, the edge AI engine generates the data analysis result based on the sensing output. In the scenario where the sensing output is an analog signal, the sensing output is converted into a digital signal before being analyzed by the edge AI engine. The edge AI engine may analyze the sensing output using a physical model-based machine learning algorithm.

In Step 203, a determination is made as to whether additional sensing element is active and can be used for assessing the ongoing activity in the environment. If the determination is positive, i.e., at least one additional sensing element is active and can be used for assessing the ongoing activity in the environment, the method returns to Step 201. If the determination is negative, i.e., all active sensing element has been included for assessing the ongoing activity in the environment, the method proceeds to Step 204. Each iteration of Steps 201, 202 and 203 may be performed continuously, periodically, intermittently, as triggered by a predetermined condition in the environment, or based on other predetermined criteria.

In Step 204, a determination is made by the central AI engine, based on the data analysis results from all active sensing elements, whether the data analysis result of a particular modality is to be included or excluded in generating a classification result of the environment. Specifically, the central AI engine determines, based on initial assessments from the edge AI engines with active sensing elements, which modalities are pertinent to classifying the current ongoing activity of the environment. For example, the central AI engine may make the determination based on deep machine learning using convolutional neural network trained with labeled data of all sensing elements in the integrated sensing system.

In Step 205, a determination is made as to whether any inactive sensing element with an additional modality is needed for assessing the ongoing activity in the environment. If the determination is positive, i.e., at least one inactive sensing element with an additional modality is needed, the method proceeds to Step 207. If the determination is negative, i.e., none of the inactive sensing element(s) with additional modality is needed, the method proceeds to Step 208.

In Step 206, a determination is made as to whether any active sensing element is not pertinent for assessing the ongoing activity in the environment. If the determination is positive, i.e., at least one active sensing element is not pertinent, the method proceeds to Step 207. If the determination is negative, i.e., all active sensing elements are pertinent, the method proceeds to Step 208.

In Step 207, a command is sent to an edge AI engine to activate or deactivate the sensing element controlled by the edge AI engine. In the case where the sensing element is determined in Step 205 as to provide additional needed modality, the command causes the edge AI engine to activate the sensing element. In the case where the sensing element is determined in Step 206 as having the modality that is not pertinent, the command causes the edge AI engine to deactivate the sensing element.

In Step 208, a classification result of the environment is generated, by the central AI engine using a central AI algorithm, based on all available analysis results. In some embodiments of the invention, multiple integrated sensing systems are employed to classify complex ongoing activity in the environment. In such embodiments, intermediate classification results are exchanged among the connected integrated sensing systems to cooperatively generate the final classification result. For example, the intermediate classification results may be exchanged among the integrated sensing systems via point-to-point connections. In another example, the intermediate classification results may be exchanged among the integrated sensing systems via a private blockchain network.

In Step 209, the classification result of the environment is provided by the central AI engine to a notification unit of the environment, such as audio or visible alarming systems. While data exchange between edge AI engines and the central AI engine are performed using direct connections, such as hardwired electrical and/or optical fiber connections, the classification result may be provided by the central AI engine to notification unit via direct connections or via a network connection.

Figure 3A:
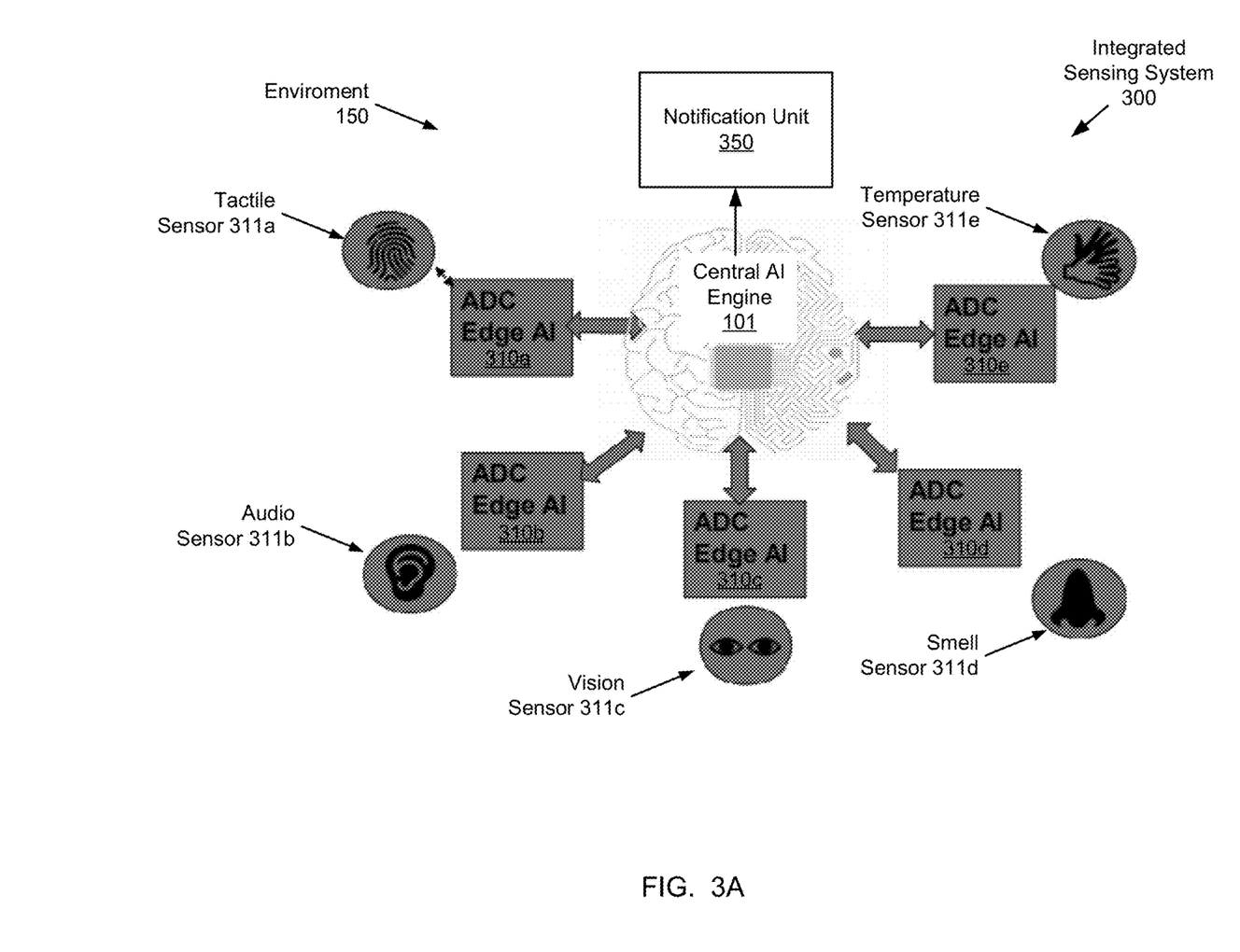
FIGS. 3A-3C show an implementation example in accordance with one or more embodiments of the invention.
Figure 3B:
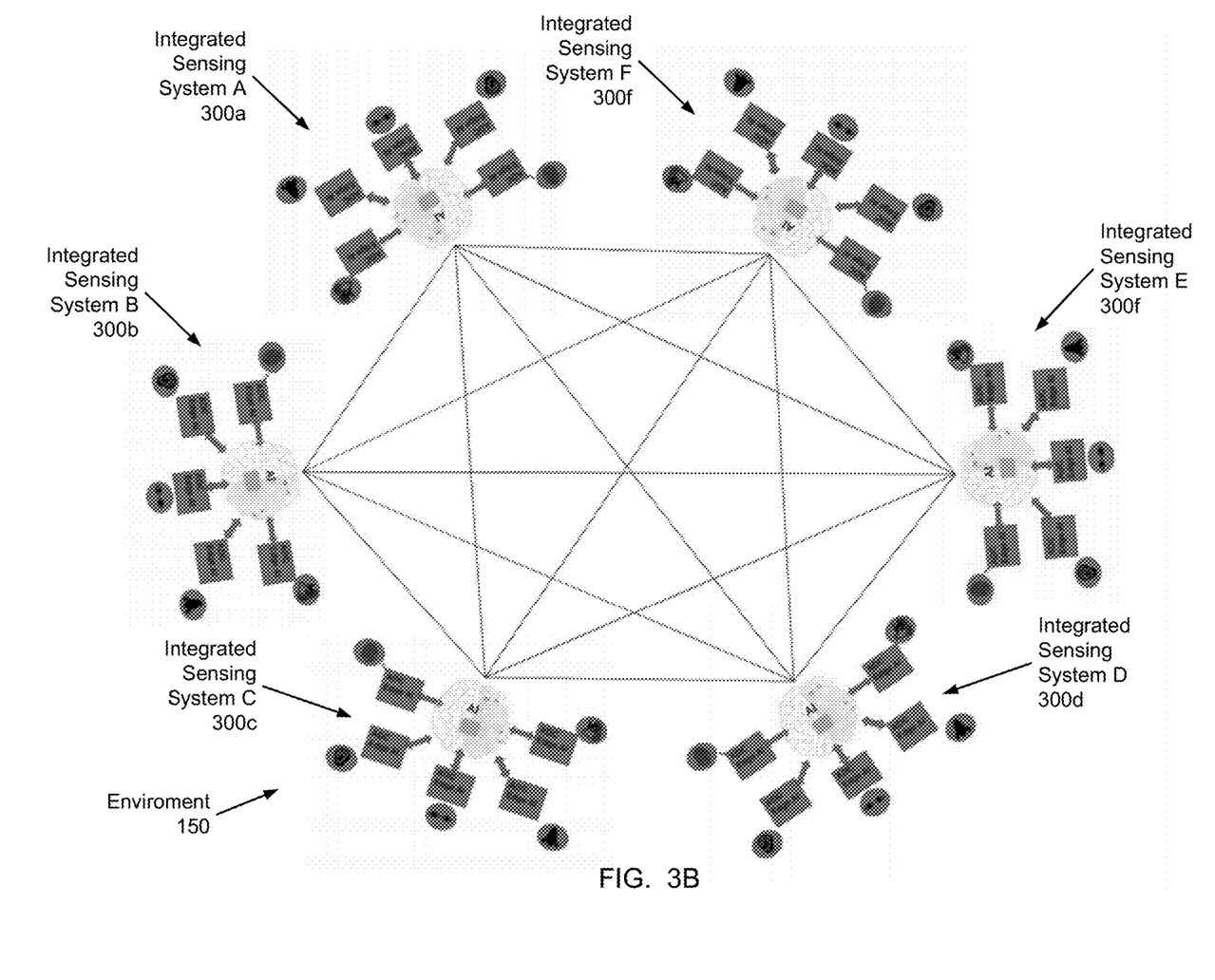
Figure 3C:
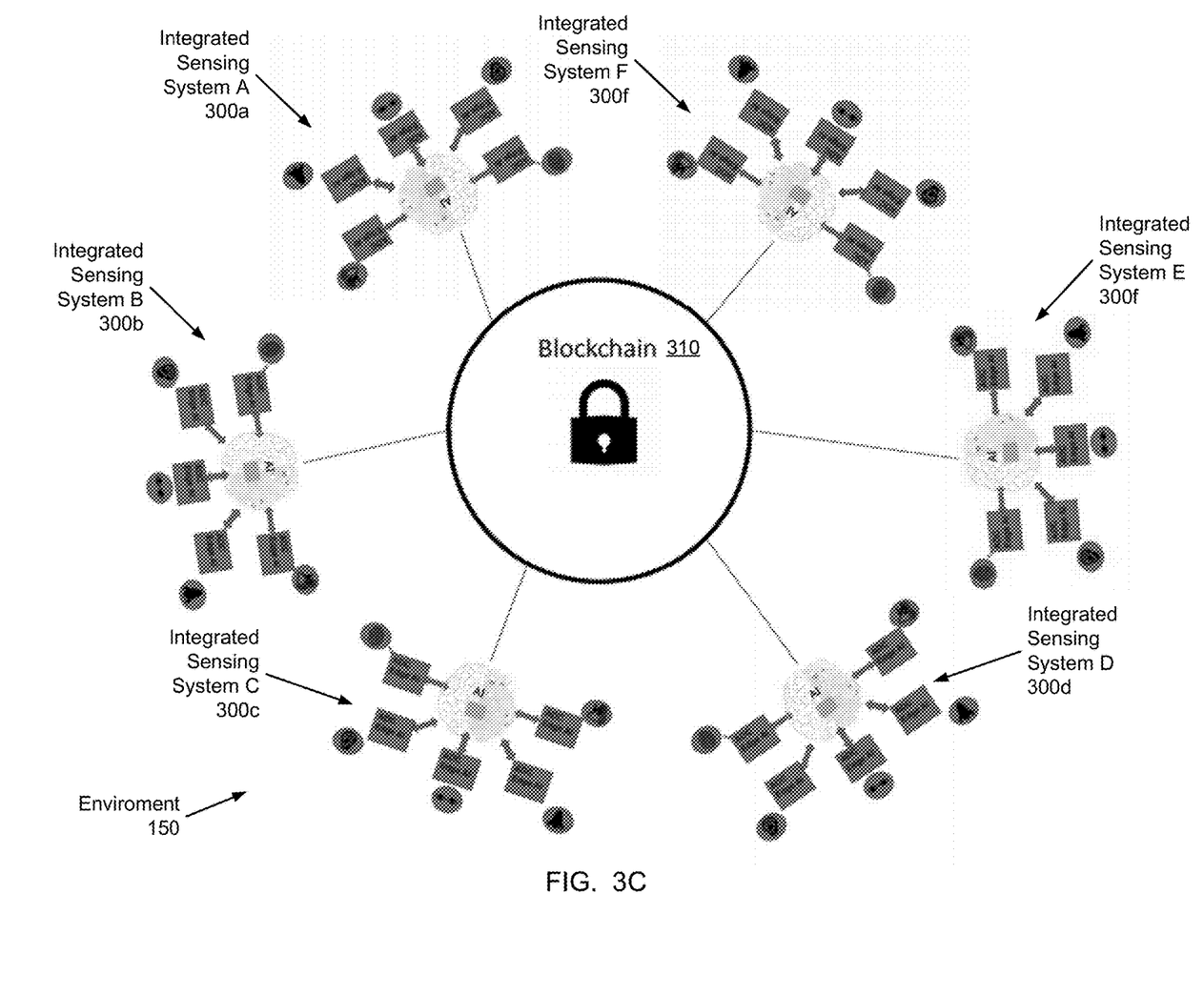

FIGS. 3A-3C show an implementation example in accordance with one or more embodiments of the invention. The implementation example shown in FIGS. 3A-3C is based on the system and method flowchart described in reference to FIGS. 1 and 2 above. Specifically, elements depicted in FIG. 1 and FIGS. 3A-3C with like reference designators correspond to each other. In one or more embodiments of the invention, one or more of elements shown in FIGS. 3A-3C may be omitted, repeated, and/or organized in a different arrangement. Accordingly, the scope of the invention should not be considered limited to the specific arrangement of elements shown in FIGS. 3A-3C.

In one or more embodiments, the example implementation shown in FIGS. 3A-3C corresponds to an integrated sensing system that has sensing modalities for many different stimuli with wide sensing ranges to function as a universal sensing platform for many applications. Each sensing modality and range are controlled by artificial intelligence to achieve high performance with optimum operational cost and energy usage without using computing resources through networked Cloud.

The following table lists performance of the integrated sensing system compared with human sensing.

TABLE 1

| Sensing Modality | Human | Ultra-sensing System |
|---|---|---|
| Vision | Visible rage (400-750 nm) | UV to FIR (350 nm-1 micron) |
| Audio | 10 Hz-20 kHz | 1 Hz-1 GHz |
| Tactile | <70 mg | <0.1 mg |
| Temperature (non-contact) | 0.1-0.2 C. | 0.01 C. |
| Smell | 1012 species | 10 15 species |
| Response time | 100-300 msec | 10 msec |

The integrated sensing system (300) shown in FIG. 3A is an example of the integrated sensing system (100) shown in FIG. 1 above. The sensing elements of the integrated sensing system (300) include a tactile sensor (311a), audio sensor (311b), vision sensor (311c), smell sensor (311d), and temperature sensor (311e), which are examples of the sensing element A (111a), sensing element B (111b), and sensing element C (111c) shown in FIG. 1 above. Each sensing element is attached to an edge control unit consisting of an analog-to-digital converter (ADC) and an edge AI engine. The edge control units (310a, 310b, 310c, 310d, 310e) correspond to examples of the edge AI engine A (110a), edge AI engine B (110b), and edge AI engine C (110c) shown in FIG. 1 above.

In the example integrated sensing system (300), the signal from each sensing element is an analog signal that is converted by the ADC to a digital signal for the corresponding edge AI engine. The primary control and data analysis are conducted at the edge AI engine level. All sensing elements and edge AI engines are connected to the central AI engine (101) for decision-making process. If complex data analytics and decision-making processes are required, the digital signal from the edge AI engine is sent to the central AI engine (101). The criteria for sending the digital signal from the edge AI engine to the central AI engine (101) is based on S/N ratio, range of signal, and number of trained dataset at each edge AI engine. For example, if S/N ratio is below 3.0, signal being beyond or below ranges listed in TABLE 1 above, and training dataset being less than 1,000 entries, the ongoing activity in the environment (150) cannot be classified at the edge AI engine level and the information is passed on to the central AI engine for decision making.

Algorithms of the edge AI engine are based on physical model-based machine learning for each sensing modality. The central AI engine (101) determines which sensing modality and edge AI engine should be fully powered to obtain the maximum signal for a certain stimulus. Unnecessary sensing modalities are kept in standby modes.

The central AI engine (101) is based on deep learning using convolutional neural network trained with labeled data of all sensing modalities for classification and decision-making process. Algorithms of the central AI engine (101) also contain transfer learning capability to address unlearned situations and reinforced learning to select the optimum solutions.

In an example where the environment (150) corresponds to a care home, if the sensing output of the vision sensor (311c) is analyzed by the edge AI engine (310c) to indicate possibility of a person's fall, the audio sensor (311b) is fully powered up to the highest level by the central AI engine (101) to detect noise and voice to assess the situation, and other sensors (311a, 311d, 311e) are kept in the stand-by mode for optimum operation of the integrated sensing system (300). Based on the optimum operation of the integrated sensing system (300), the central AI engine (101) accurately classifies the ongoing activity in the environment (150) as the person's fall at a particular location and expediently provides the classification result to the notification unit (350). For example, the notification unit (350) may be an alert system that automatically dispatches care home staff to assist the falling person at the particular location.

In another example where the environment (150) corresponds to a chemical factory, if the sensing output of the smell sensor (311d) is analyzed by the edge AI engine (310d) to indicate an abnormal level of certain smells/chemicals, the audio sensor (311b) is fully powered up to the highest level by the central AI engine (101) to locate a chemical leak, while other unnecessary sensors (311a, 311c, 311e) are maintained in the standby modes. Based on the optimum operation of the integrated sensing system (300), the central AI engine (101) accurately classifies the ongoing activity in the environment (150) as the chemical leak at a particular location and expediently provides the classification result to the notification unit (350). For example, the notification unit (350) may be an automatic shut off valve that automatically shuts off the piping network to isolate the chemical leak at the particular location.

In another example where the environment (150) corresponds to an airport, if the sensing output of the vision sensor (311c) is analyzed by the edge AI engine (310c) to indicate an abnormal behavior of a person, the smell sensor (311d) and the audio sensor (311b) are fully powered up to the highest level by the central AI engine (101) to detect any volatile organic compound (VOC) and abnormal noise to assess the situation, and other impertinent sensors (311a, 311e) are kept in standby mode. Based on the optimum operation of the integrated sensing system (300), the central AI engine (101) accurately classifies the ongoing activity in the environment (150) as a terrorist activity at a particular location and expediently provides the classification result to the notification unit (350). For example, the notification unit (350) may be a security dispatch system that automatically dispatches security personnel to the particular location.

The edge AI engines and associated sensors may be placed with the central AI engine (101) or distributed over other locations through hard wiring or optical fiber connections depending on the specific applications. This method ensures secure sensing system and eliminating external hacking and manipulation of the sensing system.

FIG. 3B shows an example of an extremely complex situation where multiple integrated sensing systems collaboratively analyze and assess the situation in the environment (150). For example, if the labeled training datasets are less than 100,000 entries for the central AI engine in a single integrated sensing system, multiple integrated sensing systems are employed. For example, point-to-point connections are used to connect the integrated sensing system A (300a), integrated sensing system B (300b), integrated sensing system C (300c), integrated sensing system D (300d), and integrated sensing system E (300e) that are copies or variations of the integrated sensing system (300) shown in FIG. 3A. There are no limitations in the number of integrated sensing systems to work together depending on the complexity of the problem and required response time.

FIG. 3C shows an example where highly secure collaboration is required in the environment (150). In this example, multiple integrated sensing systems are connected as peer nodes through the private blockchain network (310), and all data are communicated using cryptography. In particular, the blockchain network (310) is an infrastructure that provides ledger and smart contract services to each of the integrated sensing system A (300a), integrated sensing system B (300b), integrated sensing system C (300c), integrated sensing system D (300d), and integrated sensing system E (300e) that are copies or variations of the integrated sensing system (300) shown in FIG. 3A. Primarily, smart contracts are used to generate transactions which are subsequently distributed to every peer node in the blockchain network (310) to be immutably recorded on each peer node's copy of the ledger.

Figure 4:
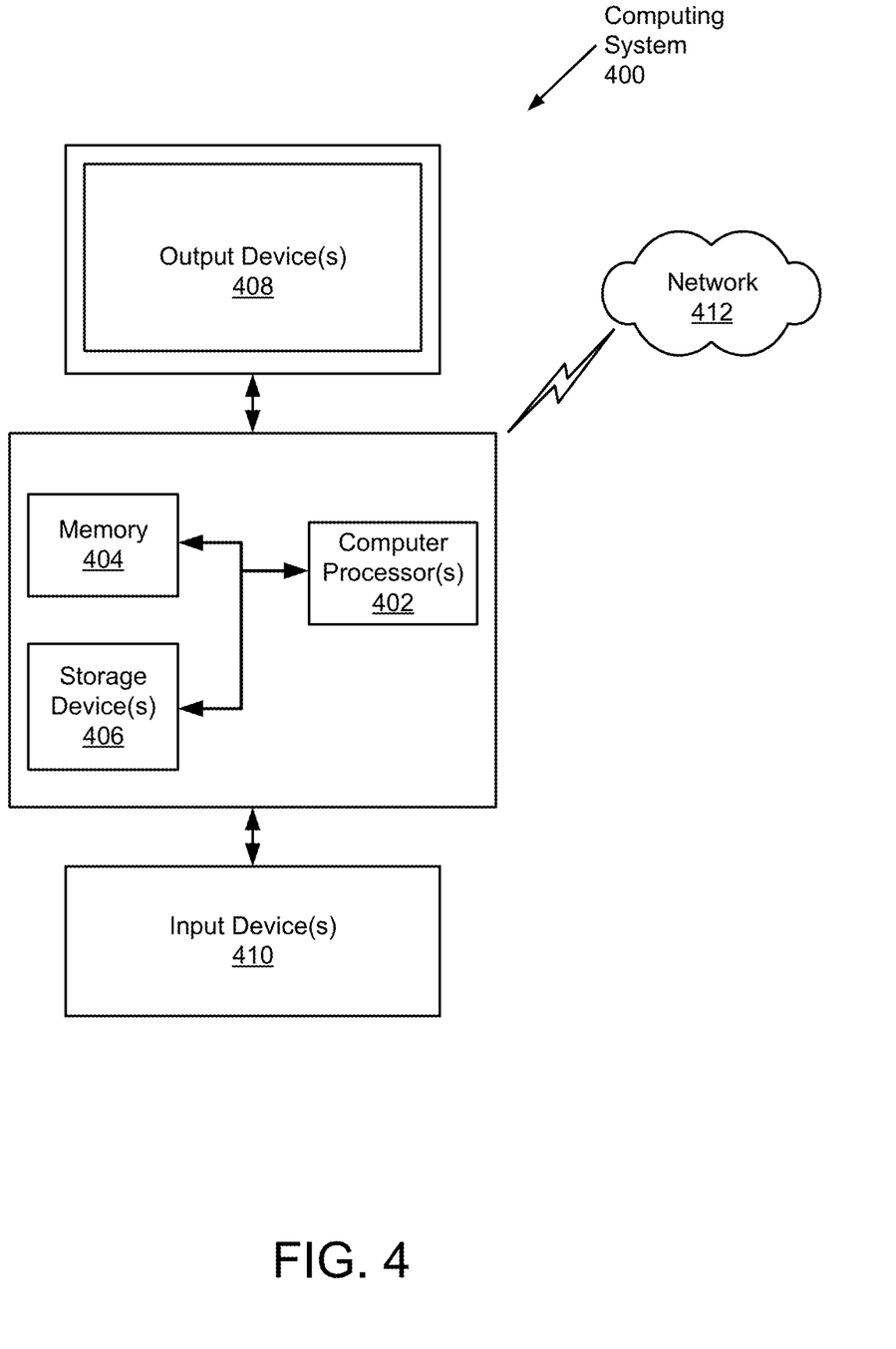
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages: utilizing integrated sensing system with multiple modalities having high sensitivities, eliminating reliance on large central computer system through Cloud for controlling the system, completing all decision making by the central AI in the integrated sensing system, utilizing collaborative intelligence for complex decision making, achieving low cost fully functional sensory system and rapid response time without communication with Cloud, ability to select optimum sensing modality, and high security using Blockchain.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated sensing system to perform multi-modality sensing of an environment, comprising:
    a first sensing element that generates a first modality sensing output of the environment;
    a first edge artificial intelligence (AI) engine that controls the first sensing element and generates a first data analysis result based on the first modality sensing output;
    a second sensing element that generates a second modality sensing output of the environment;
    a second edge AI engine that controls the second sensing element and generates a second data analysis result based on the second modality sensing output; and
    a computer processor that generates, using a central AI algorithm, a classification result of the environment based on the first data analysis result and the second data analysis result,
    wherein the computer processor is directly coupled to the first edge AI engine and the second edge AI engine,
    wherein the first sensing element comprises a smell sensor and the second sensing element comprises a tactile sensor.

2. The integrated sensing system of claim 1, wherein the computer processor further provides the classification result of the environment to a notification unit of the environment.

3. The integrated sensing system of claim 1, further comprising:
    a third sensing element that generates a third modality sensing output of the environment;
    and a third edge AI engine that controls the third sensing element and generates a third data analysis result based on the third modality sensing output,
    wherein the computer processor generates the classification result of the environment by:
        determining, using the central AI algorithm and based on the first data analysis result and the second data analysis result, that the third data analysis result is to be included in generating the classification result of the environment; and
        sending a command to the third edge AI engine to activate the third sensing element in generating the third modality sensing output of the environment, wherein the third sensing element comprises a vision sensor with a sensing wavelength spectrum from 350 nano-meter to 1 micro-meter, and wherein the classification result of the environment corresponds to a person's fall based at least on the third modality sensing output from said vision sensor.

4. The integrated sensing system of claim 1, wherein the computer processor generates the classification result of the environment by:

determining, using the central AI algorithm and based on the first data analysis result and the second data analysis result, that the second data analysis result is to be excluded in generating the classification result of the environment; and sending a command to the second edge AI engine to deactivate the second sensing element in generating the second modality sensing output of the environment, wherein the first modality sensing output corresponds to a chemical smell, and wherein the classification result of the environment corresponds to a chemical leak.

5. The integrated sensing system of claim 1, wherein the first edge AI engine generates the first data analysis result using a physical model-based machine learning algorithm.

6. The integrated sensing system of claim 1, wherein the central AI algorithm is based on deep learning using convolutional neural network trained with labeled data of at least the first sensing element and the second sensing element.

7. The integrated sensing system of claim 1, further comprising:

a communication interface that communicates with an additional integrated sensing system through a private block chain network, wherein the computer processor generates the classification result of the environment by exchanging, via the communication interface, intermediate classification results between the integrated sensing system and the additional integrated sensing system, and the classification result is cooperatively generated by the integrated sensing system and the additional integrated sensing system based on at least the intermediate classification results.

8. A method to perform multi-modality sensing of an environment, comprising:

generating, by a first sensing element, a first modality sensing output of the environment;

generating, by a first edge artificial intelligence (AI) engine for controlling the first sensing element, a first data analysis result based on the first modality sensing output;

generating, by a second sensing element, a second modality sensing output of the environment;

generating, by a second edge AI engine for controlling the second sensing element, a second data analysis result based on the second modality sensing output; and generating, by a computer processor using a central AI algorithm, a classification result of the environment based on the first data analysis result and the second data analysis result, wherein the computer processor is directly coupled to the first edge AI engine and the second edge AI engine, and wherein the first sensing element and the second sensing element each comprises one or more of a smell sensor and a tactile sensor.

9. The method of claim 8, further comprising:

providing, by the computer processor, the classification result of the environment to a notification unit of the environment.

10. The method of claim 8, further comprising:

generating, by a third sensing element, a third modality sensing output of the environment; and analyzing, by a third edge AI engine for controlling the third sensing element, the third modality sensing output to generate a third data analysis result, wherein generating the classification result of the environment by the computer processor comprises:

determining, using the central AI algorithm and based on the first data analysis result and the second data analysis result, that the third data analysis result is to be included in generating the classification result of the environment; and sending a command to the third edge AI engine to activate the third sensing element in generating the third modality sensing output of the environment, wherein the third sensing element comprises a vision sensor with a sensing wavelength spectrum from 350 nano-meter to 1 micro-meter, and wherein the classification result of the environment corresponds to a person's fall based at least on the third modality sensing output from said vision sensor.

11. The method of claim 8, wherein generating the classification result of the environment by the computer processor comprises:

determining, using the central AI algorithm and based on the first data analysis result and the second data analysis result, that the second data analysis result is to be excluded in generating the classification result of the environment; and sending a command to the second edge AI engine to deactivate the second sensing element in generating the second modality sensing output of the environment, wherein the first modality sensing output corresponds to a chemical smell, and wherein the classification result of the environment corresponds to a chemical leak.

12. The method of claim 8, wherein the first edge AI engine generates the first data analysis result using a physical model-based machine learning algorithm.

13. The method of claim 8, wherein the central AI algorithm is based on deep learning using convolutional neural network trained with labeled data of at least the first sensing element and the second sensing element.

14. The method of claim 8, wherein generating the classification result of the environment by the computer processor comprises:

exchanging, via a private block chain network, intermediate classification results between the integrated sensing system and an additional integrated sensing system, wherein the classification result is cooperatively generated by the integrated sensing system and the additional integrated sensing system based on at least the intermediate classification results.

15. A non-transitory computer readable medium (CRM) storing computer readable program code to perform multi-modality sensing of an environment, wherein the computer readable program code, when executed by a computer processor, comprises functionality for:

generating, by a first sensing element, a first modality sensing output of the environment;

generating, by a first edge artificial intelligence (AI) engine for controlling the first sensing element, a first data analysis result based on the first modality sensing output;

generating, by a second sensing element, a second modality sensing output of the environment; generating, by a second edge AI engine for controlling the second sensing element, a second data analysis result based on the second modality sensing output; and generating, by a central AI engine using a central AI algorithm, a classification result of the environment based on the first data analysis result and the second data analysis result, wherein the computer processor is directly coupled to the first edge AI engine and the second edge AI engine, and wherein the first sensing element and the second sensing element each comprises one or more of a smell sensor and a tactile sensor.

16. The non-transitory CRM of claim 15, wherein the computer readable program code, when executed by the computer processor, further comprises functionality for:

providing, by the central AI engine, the classification result of the environment to a notification unit of the environment.

17. The non-transitory CRM of claim 15, wherein the computer readable program code, when executed by the computer processor, further comprises functionality for:

generating, by a third sensing element, a third modality sensing output of the environment; and analyzing, by a third edge AI engine for controlling the third sensing element, the third modality sensing output to generate a third data analysis result, wherein generating the classification result of the environment by the computer processor comprises:

determining, using the central AI algorithm and based on the first data analysis result and the second data analysis result, that the third data analysis result is to be included in generating the classification result of the environment; and sending a command to the third edge AI engine to activate the third sensing element in generating the third modality sensing output of the environment, wherein the third sensing element comprises a vision sensor with a sensing wavelength spectrum from 350 nano-meter to 1 micro-meter, and wherein the classification result of the environment corresponds to a person's fall based at least on the third modality sensing output from said vision sensor.

18. The non-transitory CRM of claim 15, wherein generating the classification result of the environment by the computer processor comprises:

determining, using the central AI algorithm and based on the first data analysis result and the second data analysis result, that the second data analysis result is to be excluded in generating the classification result of the environment; and sending a command to the second edge AI engine to deactivate the second sensing element in generating the second modality sensing output of the environment, wherein the first modality sensing output corresponds to a chemical smell, and wherein the classification result of the environment corresponds to a chemical leak.

19. The non-transitory CRM of claim 15, wherein the first edge AI engine generates the first data analysis result using a physical model-based machine learning algorithm, and the central AI algorithm is based on deep learning using convolutional neural network trained with labeled data of at least the first sensing element and the second sensing element.

20. The non-transitory CRM of claim 15, wherein generating the classification result of the environment comprises:

exchanging, via a private block chain network, intermediate classification results between the integrated sensing system and an additional integrated sensing system, wherein the classification result is cooperatively generated by the integrated sensing system and the additional integrated sensing system based on at least the intermediate classification results.

* * * * *